Feb. 20, 1945.  A. B. WHITE  2,370,100
ARC WELDING ELECTRODE
Filed Dec. 3, 1942

WITNESSES:
Edward Michaels
F. V. Giolma

INVENTOR
Alfred B. White.
BY
Crawford
ATTORNEY

Patented Feb. 20, 1945

2,370,100

UNITED STATES PATENT OFFICE 2,370,100

ARC-WELDING ELECTRODE

Alfred B. White, Murrysville, Pa., assignor to Westinghouse Electric & Manufacturing Company, East Pittsburgh, Pa., a corporation of Pennsylvania Application December 3, 1942, Serial No. 467,721

11 Claims. (Cl. 219—8)

My invention relates, generally, to arc welding, and it has reference, in particular, to coated arc welding electrodes, and methods and apparatus for improving the arc striking qualities of such electrodes.

Generally stated, it is an object of my invention to provide for improving the arc striking characteristics of coated arc welding electrodes in a manner that is both simple and inexpensive.

More specifically, it is an object of my invention to provide for rendering the tip of a coated electrode at least partially conducting and readily ionizable in order to facilitate striking an arc.

It is also an object of my invention to provide for coating the ends of coated arc welding electrodes with a semi-conducting material.

Another object of my invention is to provide for pretreating the ends of coated welding electrodes containing organic materials so as to carbonize the ends thereof to make them semi-conducting and readily ionizable.

Yet another object of my invention is to provide for coating the tips of arc welding electrodes with a mixture comprising a binder, a semi-conducting material and an ionizing material.

Still another object of my invention is to provide apparatus that is simple and inexpensive for coating the tips of arc welding electrodes.

Other objects will, in part, be obvious and will, in part, be explained hereinafter.

In practicing one embodiment of my invention, the tip of a flux coated electrode of the usual type, wherein the coating is substantially non-conducting is provided with a semi-conducting coating. Such a coating produces increased ionization when the electrode contacts the work and overcomes the difficulties usually experienced in striking an arc with a new electrode, particularly when welding with alternating current at relatively low current densities. The tip coating is applied by moving the electrode past one edge of a conical wheel, the other edge of which dips into a container filled with a mixture of colloidal graphite, sodium silicate, and a fibrous material such as wood pulp. Sufficient of the mixture is thus applied to the electrode tips to provide semi-conducting and readily ionizable end portions which are invaluable in striking an arc.

For a more complete description of the nature and scope of my invention, reference may be had to the following detailed description, which may be studied in connection with the accompanying drawing, in which.

Figure 1:
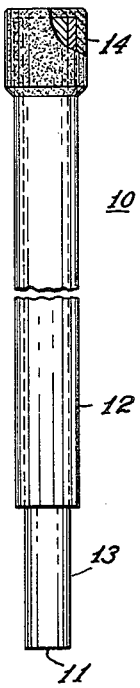
Figure 1 is a view of a welding electrode embodying the principal features of the invention.

Referring to Fig. 1, the reference numeral 10 may denote, generally, a welding electrode comprising a core member 11, a flux coating 12 covering the core member throughout a principal portion thereof, and an arc tip 14.

The core member may be of any suitable material comprising, for example, a metallic rod of substantially the composition it may be desired to deposit in the weld. The invention is not limited to any particular type of core member but may be practiced in connection with any type of weld rods whether ferrous, non-ferrous, or an alloy of any description.

As is well known in the art, the core member 11 may be provided with a suitable flux coating throughout a principal portion thereof, usually leaving an exposed end portion 13 whereby the electrode may be gripped and current supplied to it. The invention is not limited to use with any one particular type of flux coating. In general, these coatings may be described as substantially non-conducting and may comprise mixtures in varying degrees of any of a number of well known materials such as, for example, rutile, asbestos, kaolin, feldspar, whiting, sodium silicate, ferro-manganese, cellulose, magnetite, silica, manganese oxide, and others.

In order to facilitate striking an arc between the electrode 10 and work upon which a welding operation is to be performed, I propose to make the arc tip 14 of a material or materials which form a conducting, but, nevertheless, moderately high resistance path between the electrode and the work, so that the heat resulting from current flowing therethrough produces a relatively highly ionized path which assists in striking an arc as soon as the electrode is separated from the work. The arc tip may further provide a source of ionization which assists in establishing the welding arc.

I have, for example, found that by making the arc tip 14 of colloidal graphite the arc striking qualities of the new electrodes are greatly improved, and, particularly, when using alternating current at low current densities. The addition of sodium silicate to the colloidal graphite provides not only a better binder for the material of the arc tip, but also an additional source of ionization, so that the arc is more readily struck.

Potassium silicate may be also used as an ionizing material, as may a number of other potassium salts, and other ionizing materials, including the rare earth metals. Other materials may also be used in the arc tip, such as, for example, mixtures of iron oxide and aluminum powder which provide an exothermic reaction. Not only do the aluminum particles provide a relatively high resistance path which produces ionization, but the heat of the exothermic reaction further assists in producing an ionized path for the arc. Both or either of the aluminum and iron oxide may be used to provide semi-conducting coatings with sodium silicate as a binder, and they may be also used together with different quantities of colloidal graphite.

In addition to the above materials for providing conducting and ionizing tip coatings, fibrous materials may be included in the arc tip to increase the resistance of the tip to shock and abrasion. For example, cellulosic materials such as wood pulp, cotton fibers, or the like, may be combined with the conducting and ionizing materials to produce a more shock resistant arc tip coating. Metallic materials may also be used in a fibrous form, such as fine wires or short fibrous steel wool, to not only provide a relatively high resistance path between the work and the core of the electrode, but also to assist in binding the material of the tip to provide a shock resistant arc tip.

Figure 2:
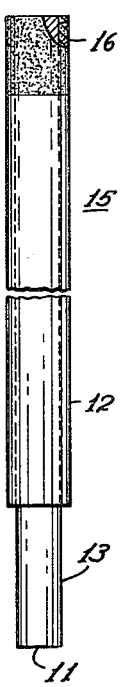
Fig. 2 shows a welding electrode embodying a modification of the invention.

Referring to Fig. 2, the reference numeral 15 may denote, generally, a welding electrode having a core member 11 provided with a flux coating 12 throughout the principal portion thereof and having an arc tip 16.

Instead of comprising an additional layer of material over the usual flux coating, the arc tip 16 may in this instance comprise a portion of the coating 12. For example, since the flux coating is usually fairly porous, the end portion may be impregnated during the manufacturing process or thereafter with any of the materials mentioned in connection with the electrode 10 of Fig. 1 or any combination thereof, to provide a semi-conducting and relatively ionizable arc tip 16. Instead of adding such materials, the tip of the flux coating 12 which usually contains a fair proportion of organic materials may be pre-treated to make it semi-conducting. The tip of the electrode may, for example, be heated by a gas flame or by high frequency induction to carbonize the organic material therein. Sufficient carbonization of the tip material may also be produced by drawing a spark or series of sparks between the welding electrode tip and an adjacent electrode by means of a conventional high frequency, high voltage oscillator of any suitable type. A combination of these methods may also be used. For example, the flux coating adjacent the tip may be subjected to a high voltage spark which punctures the coating at one or more points, and then a solution or relatively thin paste of a semi-conducting and ionizing material may be applied thereto by dipping, painting or any other conventional method, so as to fill punctures and form a conducting path through the coating adjacent the tip.

Figure 3:
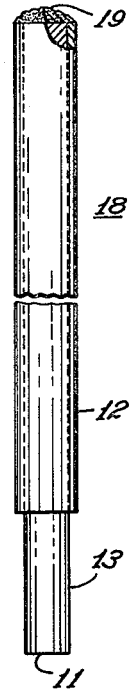
Fig. 3 shows a welding electrode embodying a further modification of the invention.

Referring to Fig. 3, the reference numeral 18 may denote, generally, a welding electrode having a core member 11 provided with a flux coating 12 and having an arc tip 19. Instead of applying an additional coating of material about the end of the usual flux coating or treating the tip portion of the usual flux coating to provide an arc tip, the excess coating material which usually adheres to the welding end of the electrode during manufacture may be utilized to provide the arc tip. The excess material, while itself is substantially non-conducting, may be treated to make it conducting. The excess material may, for example, be heated to carbonize the organic material therein either by a flame, high frequency induction or sparking. As a further method of making the excess material conducting, it may be impregnated either during or after the manufacturing operation with a solution of any of the materials used to provide the arc tip 14 of the electrode 10 in Fig. 1.

Figure 4:
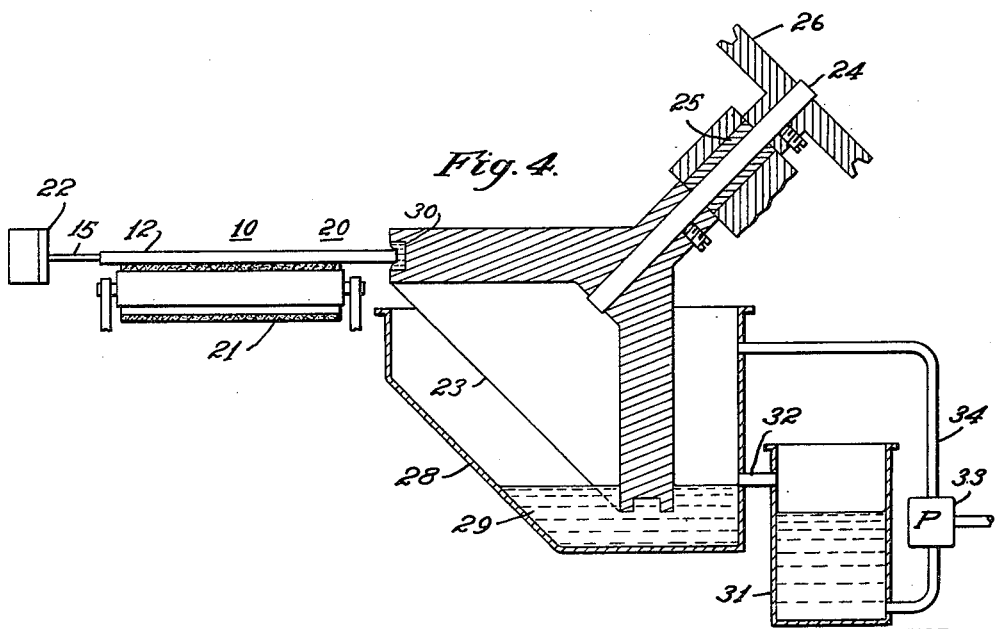
Fig. 4 is a diagrammatic view of apparatus for applying arc tips to welding electrodes.

In general, the arc tip material may be applied in any suitable manner by dipping, painting, or by application in paste form. Referring to Fig. 4, the reference numeral 20 may denote, generally, apparatus for applying arc tips to welding electrodes. For example, the electrodes 10 may be carried by means of a conveyor 21 past a suitable guard 22 which aligns the electrodes endwise. Application of the arc tip material may be made by means such as the conical wheel 23 which may be positioned adjacent the conveyor 21. The wheel 23 may, for example, be rotatably mounted by means of an inclined shaft 24 positioned in a bearing 25 and provided with driving means such as the pulley 26. The wheel 23 may be so positioned that one edge is adjacent the welding ends of the electrodes 10 while the other edge is positioned within a container 28 which contains the arc tip material 29 as a solution or fluid paste. The wheel 23 may be provided with a peripheral groove 30 wherein the ends of the electrodes 10 project as they move past the wheel so as to receive a sufficient coating of the arc tip material as they are moved thereby. The level of the arc tip material 29 may be maintained in the container by any suitable means, for example, a sump well 31 may be connected to the container 28 at the desired level by means of a conduit 32, and means such as a pump 33 may be used to maintain a sufficient flow of the arc tip material from the sump well to the container 28 through the conduit 34 to maintain the desired level of the arc tip material in the container 28.

From the above description and the accompanying drawing, it will be apparent that I have provided in a simple and inexpensive manner for improving the arc striking characteristics of coated welding electrodes. The arc tip material may be simply and inexpensively applied to the welding electrodes either during or after the usual manufacturing process. Instead of requiring frequent contacts of the electrode with the work for the purpose of striking an arc, the arc may be readily struck with but a single contact of the electrode with the work. Marring of the work by numerous arc spots heretofore caused by the frequent attempts of an operator to strike an arc is thereby prevented. The time normally lost in making a number of attempts to strike an arc is saved so that the overall time for a given welding operation may be appreciably reduced.

Since certain changes may be made in the apparatus covered by the above description without departing from the spirit and scope of the invention, it is intended that all the matter contained in the above description or shown in the accompanying drawing shall be considered as illustrative and not in a limiting sense.

I claim as my invention:

1. The combination with a metallic welding electrode having a flux coating with predetermined arc characteristics extending throughout substantially the entire length, of a semi-conducting coating adjacent the tip only and comprising a mixture of a conducting material and a binder having a high enough resistivity to produce sufficient heat to produce rapid ionization for assisting in striking an arc.

2. A semi-conductive tip coating for a flux coated electrode comprising a mixture of a carbonaceous material and a non-conducting binder for producing ionization by thermal emission projecting beyond the end of the electrode.

3. The combination with a metallic electrode having a substantially non-conducting flux coating, of a semi-conducting tip superimposed on the coating comprising, a relatively high resistance graphite composition having sufficient resistivity to produce thermal emission, an ionizing material and a binder.

4. An arc welding electrode having a substantially non-conducting flux coating and a semiconducting arc tip comprising a mixture of colloidal graphite, a potassium salt and a fibrous cellulosic material.

5. An arc welding electrode having a substantially non-conducting flux coating with a semiconductive tip comprising a mixture of particles of graphite and a cellulosic material having sufficient resistivity to produce ionization by heat upon the passage of current therethrough.

6. The combination with a substantially non-conducting flux coating on an arc welding electrode, of a partially conductive tip comprising a mixture of metal fibers, colloidal graphite and an ionizing material, said mixture having sufficient resistivity to produce thermal emission when the tip engages a workpiece to complete an arc circuit.

7. A partially conducting and ionizing arc tip for an electrode having a substantially non-conducting flux coating comprising a mixture of iron oxide, aluminum powder and sodium silicate applied to the flux coating.

8. An arc welding electrode having a substantially non-conducting flux coating impregnated with a sufficient quantity of a conducting and ionizing material adjacent the end to provide a relatively high resistance path for producing ionization heat when a circuit is completed therethrough.

9. The method of providing an electrode having a substantially non-conducting flux coating containing a cellulosic material with a partially conducting heat producing arc tip which comprises precarbonizing the end portion of the coating by subjecting it to a relatively high frequency discharge to produce openings therein and filling said openings with a conducting material.

10. The method of providing an arc welding electrode having a substantially non-conducting flux coating containing a cellulosic material with a semi-conducting arc tip which comprises subjecting the end of the electrode to a sufficiently high voltage electric discharge to puncture the coating and partially carbonize it prior to using the electrode.

11. The method of providing an arc tip on an arc welding electrode having a coating containing a cellulosic material which comprises heating only the end portion to carbonize sufficient of the cellulosic material adjacent said end to provide a relatively high resistance heat producing portion for effecting thermal emission to assist striking an arc adjacent the end without affecting the hydrocarbon content of the remainder of the coating.

ALFRED B. WHITE.